(12) United States Patent
Crespel

(10) Patent No.: US 6,529,669 B1
(45) Date of Patent: Mar. 4, 2003

(54) CABLE JUNCTION BOX, PARTICULARLY FOR OPTICAL FIBERS

(75) Inventor: Daniel Crespel, Beg Léguer (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/246,910

(22) Filed: Feb. 9, 1999

(30) Foreign Application Priority Data

Feb. 10, 1998 (FR) .............................................. 98 01558

(51) Int. Cl.⁷ ................................................. G02B 6/00
(52) U.S. Cl. ........................... 385/135; 385/49; 385/56; 385/86; 385/87; 385/100; 385/109; 385/111; 385/134; 385/137; 385/138; 385/139
(58) Field of Search .................................. 385/135, 134, 385/138, 139, 49, 56, 100, 109, 111, 86, 87, 136, 137

(56) References Cited

U.S. PATENT DOCUMENTS 4,701,015 A * 10/1987 Saito et al. .............. 350/96.23

5,684,911 A * 11/1997 Burgett ........................ 385/135

FOREIGN PATENT DOCUMENTS

| EP | 0428931 | 5/1991 |
|----|---------|--------|
| EP | 0803753 | 10/1997 |
| FR | 2528220 | 12/1983 |
| FR | 2745393 | 8/1997 |
| FR | 2750220 | 12/1997 |

* cited by examiner

Primary Examiner—Cassandra Spyrou
Assistant Examiner—Craig Curtis
(74) Attorney, Agent, or Firm—Patterson, Thuente, Skaar & Christensen, LLC

(57) ABSTRACT

A junction box for a single-tube cable, and particularly an optical fiber cable for the connection of one or several wires or fibers of the cable to one or several wires or fibers of another cable. The box has a hollow support (3) suitable for a tensioned connected cable crossing (C) and a spacer (2) to hold the casing of the axially cut cable spread inside the hollow support (3) to free the cable wires or fibers (F). Application to the installation and maintenance of cable networks is also described.

9 Claims, 5 Drawing Sheets

Figure 2C:
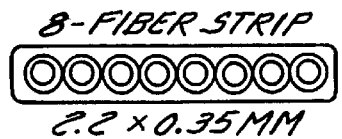
Figure 2C:
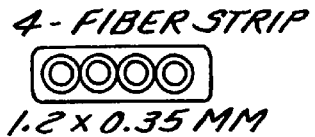

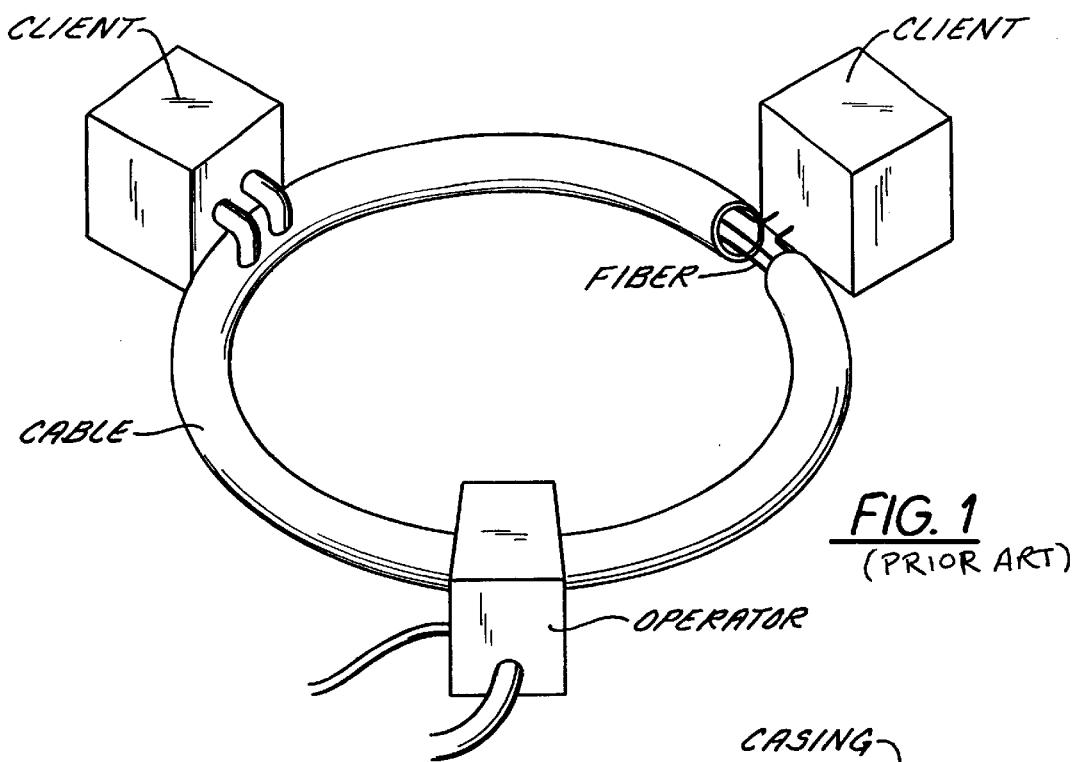
FIG. 1 (PRIOR ART)
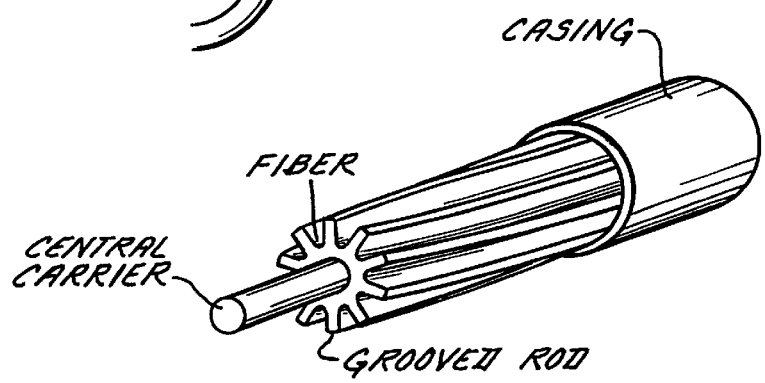
FIG. 2 (PRIOR ART)
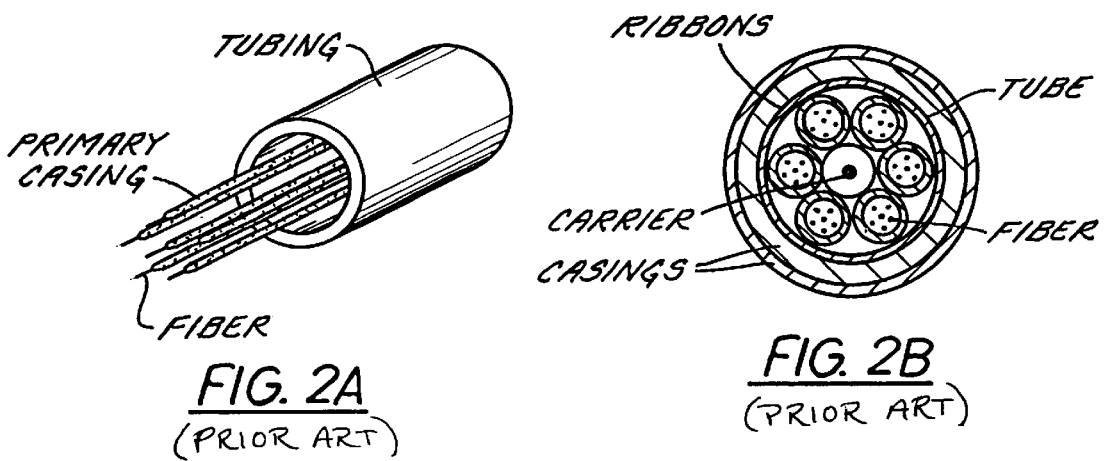
FIG. 2A (PRIOR ART)
FIG. 2B (PRIOR ART)

FIBER RIBBON MODULE

MICRO-DUCTS OR FIBER MICRO-MODULES

CABLE JUNCTION BOX, PARTICULARLY FOR OPTICAL FIBERS

CROSS-REFERENCE TO RELATED APPLICATIONS

This application claims the priority of French Application No. 98 01558, filed on Feb. 10, 1998.

The invention relates to a junction box for a tensioned cable, particularly an optical fibers cable.

The invention is applicable for making branch connections on line or in a section operated on cables.

In general, making a branch connection is an operation that consists of connecting one or several wires or one or several cable fibers to connect them to another cable.

The connection technique is a relatively recent technique used for optical fiber cables that consists of cutting the optical fiber(s) to be connected, to connect it or them to other fibers in another cable.

The applicant developed this technique with the development of Flexible Optical Networks (ROF). Refer to the diagram in FIG. 1 that illustrates the principle used for making branch connections to this type of network.

The invention can be better understood after a brief reminder about the development of the structure of currently available optical fibers.

The first cables specially designed for the production of inter-city networks are cables with grooved rods as illustrated in FIG. 2.

The cable with tubes technique was subsequently developed in order to better protect the fiber and also to encase it.

These tubes replace the grooves to more efficiently protect the fibers.

Their manufacturing process is better and less expensive than the grooved cable manufacturing process. These cables are illustrated in FIGS. 2A and 2B.

These cables were used for the production of connections between exchanges. The cables were connected at both ends and were usually used over long distances (city to city connections, creation of "national" networks).

A distribution approach was then considered for the production of networks in urban areas (ROF—flexible optical networks).

These looped networks, naturally protected by a return along a different route, improve reliability. For example, they were used for the connection of large cooperations (for example banks).

Business customers were connected more recently, usually in urban areas, with the use of the branch connection technique.

This provided an opportunity for the applicant to develop the branch connection technique.

Furthermore, two concepts of "single-tube" or distribution cables with optical characteristics approximately the same as the characteristics of inter-city network cables were developed, but with a weight reduction (weight divided by 2 for the same diameter) and an increase in the number of fibers (4 to 5 times more fibers).

Unlike transmission cables, the structure of single-tube cables is characterized (in cables containing up to 288 fibers) by a thick high density polyethylene tube containing 2 or 4 carriers. These carriers stabilize the materials. In fact, they are made of a fiber glass composite or aramide wick. Laying is facilitated by their high tensile and compression strength.

Encasing of the fibers making up single-tube cables leads to two types of optical modules, namely ribbon fibers and fibers with flexible casings.

Ribbon fibers or flat cable fibers, as illustrated in FIG. 2C, are placed side by side in a polymerized casing. This encasing is done in the factory, and facilitates the earth connection.

Figure 2D:
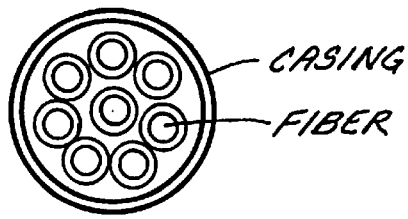

Bulk fibers with flexible casings, frequently called microducts, are illustrated in the sketch in FIG. 2D. These fibers are free to move within this colored casing. A combination of several casings is close to the state-of-the-art for a copper cable. Color marking identifies a module at the end, and also within the cross-section of a cable.

A branch connection is added into the network by using boxes designed for national networks.

Two types of boxes have been identified for this purpose:
A)—boxes in buckets or trays
B)—boxes with a base and a dome-shaped cover.

A: Boxes in buckets or trays are frequently prismatic. Cable crossings are laid out in opposition. When the cable passes continuously, an anchorage makes all cable carriers continuous. Therefore, there is one anchorage for each cable. These cables may enter on either side of the box through various sealed tubings or crossings. The cable crossing is in the same plane as the box joint plane. Therefore, the entire box has to be enclosed, usually using resins to make a good seal. Fibers are accessed by completely disassembling the box and opening the joint plane.

This box, designed for use in line with a cable over-length on each side, is more and more frequently used in a herring bone pattern, in other words in which all cables enter on the same side.

B: Boxes with base and a dome- or cap-shaped cover. They are characterized by a circular-shaped base on which rounded or oblong-shaped cable crossings cooperate with a heat sealed glued sleeve, to create the seal by deformation and by gluing.

This seal cannot be achieved unless the sleeve is put into position before the cable is installed and a heat source is necessary, which makes the operation difficult.

As in previous boxes, the anchorage transfers forces onto the cable carriers.

These boxes, widely used in England and America, are not suitable for integration of the anchorage inside the box.

Two other boxes have been described to facilitate branch connections to more recent cable structures:

C)—A box that was described in patent No. FR 96 07887 published under No. 2 750 222, and is characterized by its rounded shape. The cable over-length is wound around the perimeter, so that the connection can be made outside the pulling chamber. This box can be upgraded by the assembly of one or several bases.

The first disadvantage of box C is that it cannot be industrialized. It is designed for making branch connections on flexible cables that can be wound. The reduction in the anchorage volume and integration of the seal are useful but expensive, and furthermore space must be available for cavities to accommodate the anchorages.

D)—A box, also in the form of a tray like the previous description, comprises two symmetric elements. This box is interesting in that it is more compact, but also due to its mechanical seal. In practice it is a clone of box type A and has the same disadvantages. Mechanical continuity of the carriers is achieved by anchoring them.

A D type box derived from the design of the A type box has the same disadvantages, and particularly the same cumbersome anchorages, of the unjustified winding structures, since only a few fibers need to be organized in the case of a branch connection. The cable carrier structure is cut and reconstituted by anchorage in the box, which introduces long operations.

The winding area or the fiber access area does not facilitate connection ergonomy. In the case of a branch connection, it is desirable to have a length of at least 80 cm (40 cm on each side).

In summary, with existing boxes, the mechanical elements of the cables are cut and are then reconstituted. The anchorage operation generates large and expensive devices and introduces an increasing complexity in the design of boxes.

The box according to the invention overcomes these disadvantages.

With the box according to the invention, the cable protection can be reconstituted in the work area without the disadvantages of prior techniques, and in particular the integrity of the cable casing is maintained which immediately eliminates the need for anchorages.

The box according to the invention enables easy access to optical modules without management or organization of their over-length. With the invention, the continuity of the optical module is retained, together with a limited hierarchy of the branch connected fibers without any organization and management device.

The invention may be used in service ducts (vertical or horizontal cableways) considering the small cross-section of this box, the center line of which is coincident with the center line of the cable.

Unlike boxes according to prior art, this box may be used to repair a distribution cable (single-tube) while it is buried in the ground after an incident, for example an accidental break to the cable by mechanical machinery.

Branch connected cables inserted axially inside seals made of industrial products can reduce the cost of these crossings.

This box facilitates access to the fiber in all pulling chambers through which a distribution cable passes.

Access points no longer require expensive over-lengths.

The box facilitates branch connections during installation while the network is being built, and later even if the cable has been laid, regardless of the type of the pulling chamber.

The box is suitable for above-underground environments (columns, building foundations, etc.) or overhead environments (top of posts, building facades).

Therefore, one of the main purposes of the invention is a junction box for a cable, and particularly a single-tube optical fiber cable for the connection of one or several wire(s) or fiber(s) of this cable, called the connected cable, to one or several wires forming at least one other cable called the connecting cable, characterized particularly in that it comprises a hollow support suitable for a tensioned connected cable crossing, a spacer to hold the casing of the said axially cut cable, spread inside the hollow support in order to thus free the cable wires or fibers.

According to another characteristic, the hollow support comprises several successive compartments to house over-lengths of wires or fibers of connecting cables.

Preferably, the spacer is formed of two parallel rods rigidly attached to box attachment washers.

The hollow support is formed by a generally parallelepiped-shaped base in which there is a channel with dimensions suitable for holding the connected cable with the spacer.

The box includes one or several splice support plates located above and along this channel.

The base is closed by a cover and a gasket placed between this cover and the base that seals the box. The longitudinal edges of the base have a corrugated shape corresponding to the shapes of the compartments in order to contain the clips so that the cover can exert a pressure on the said gasket.

Figure 2E:
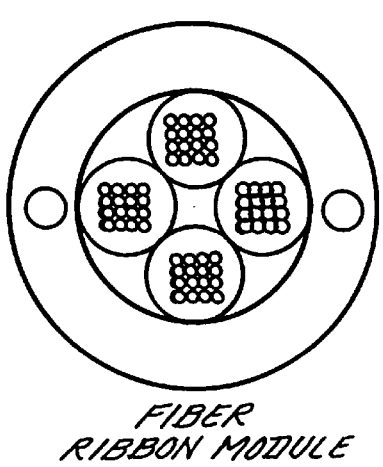
Figure 2F:
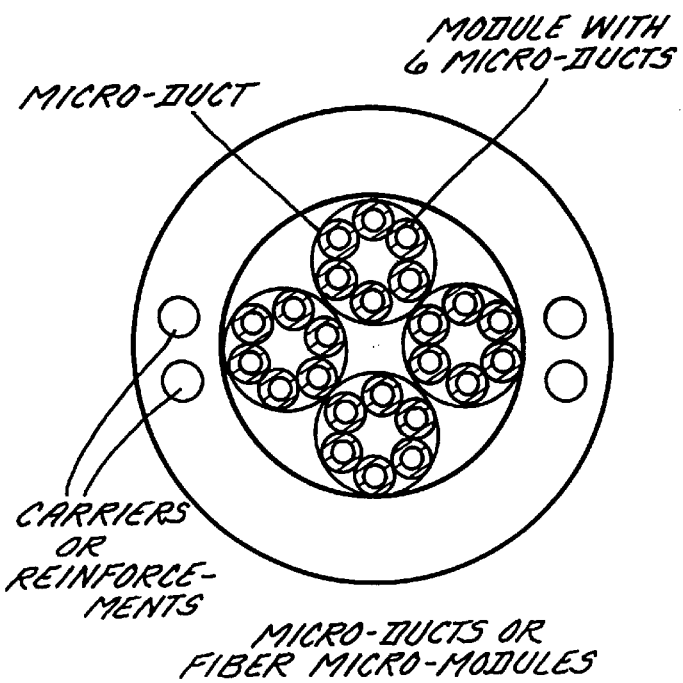
Figure 3:
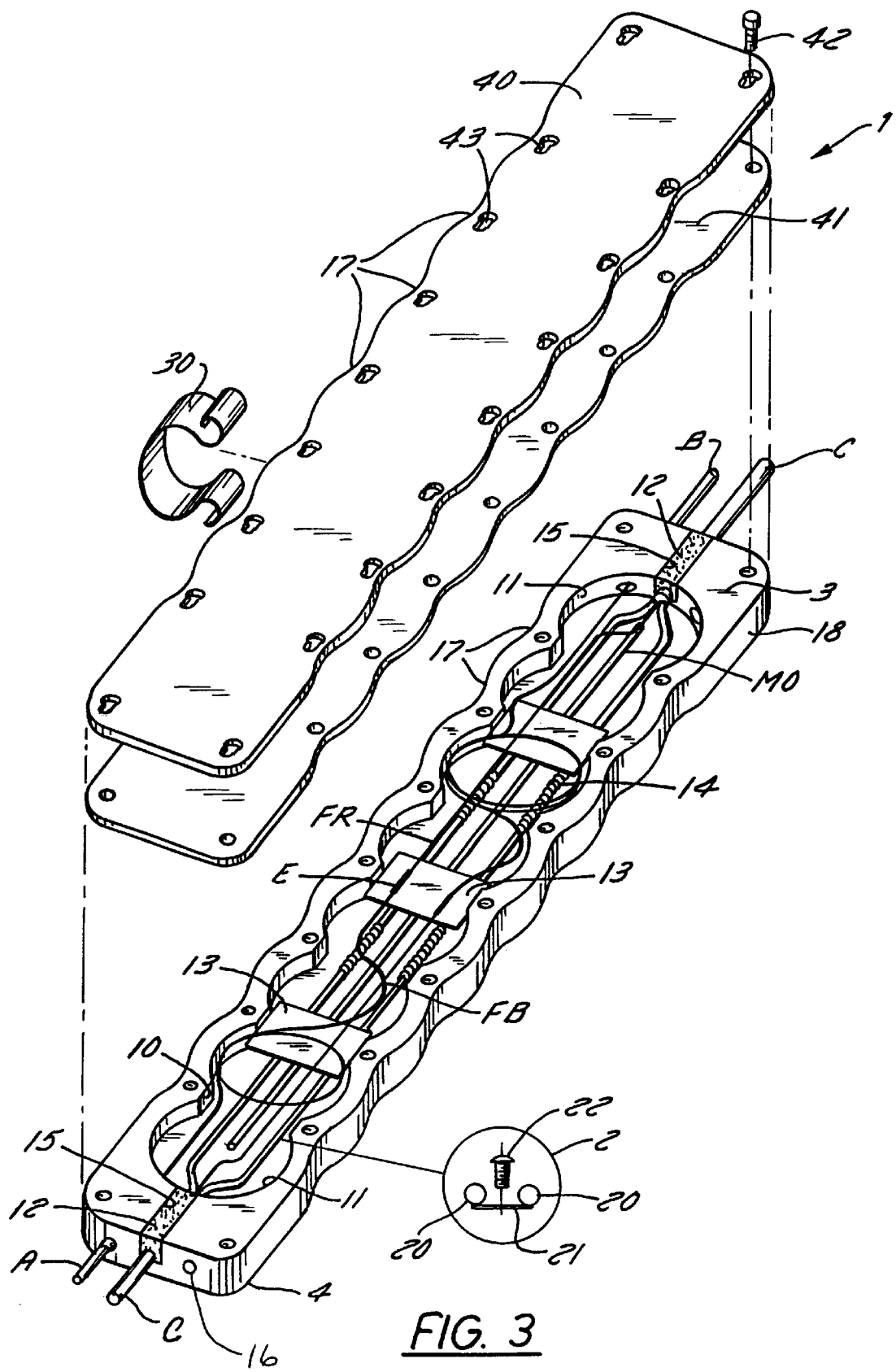
Figure 4A:
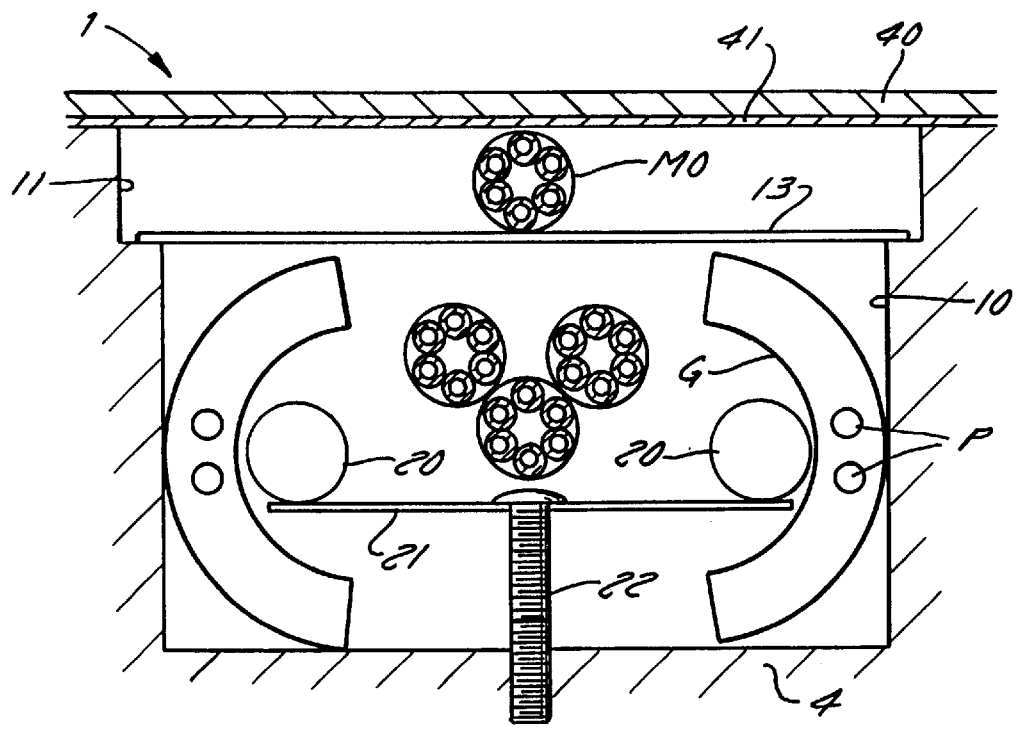
Figure 4B:
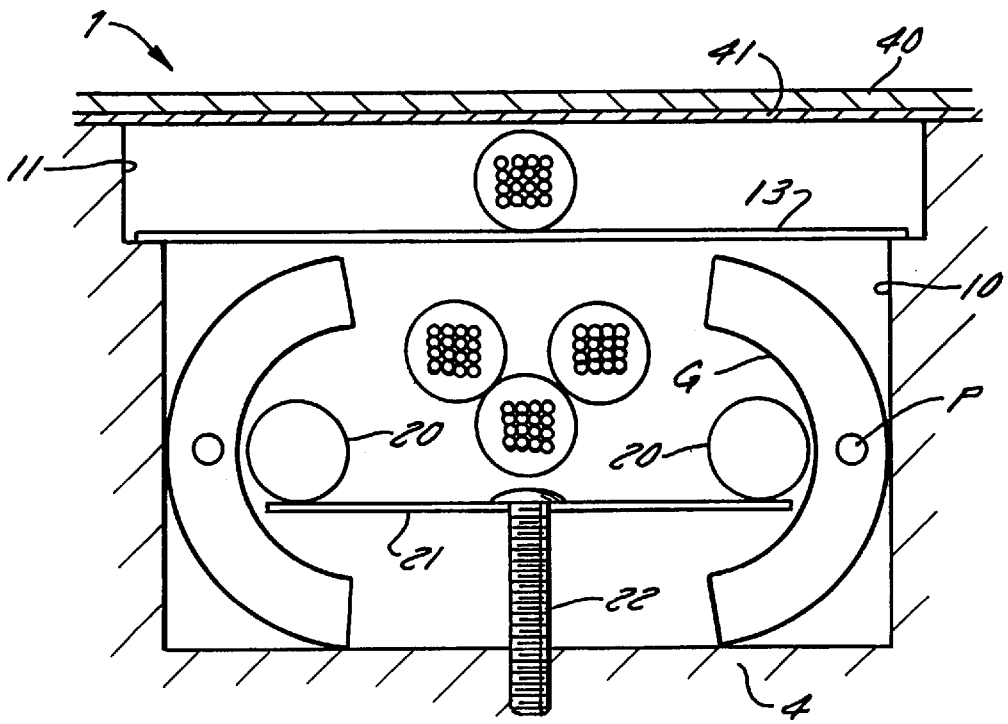
Figure 5:
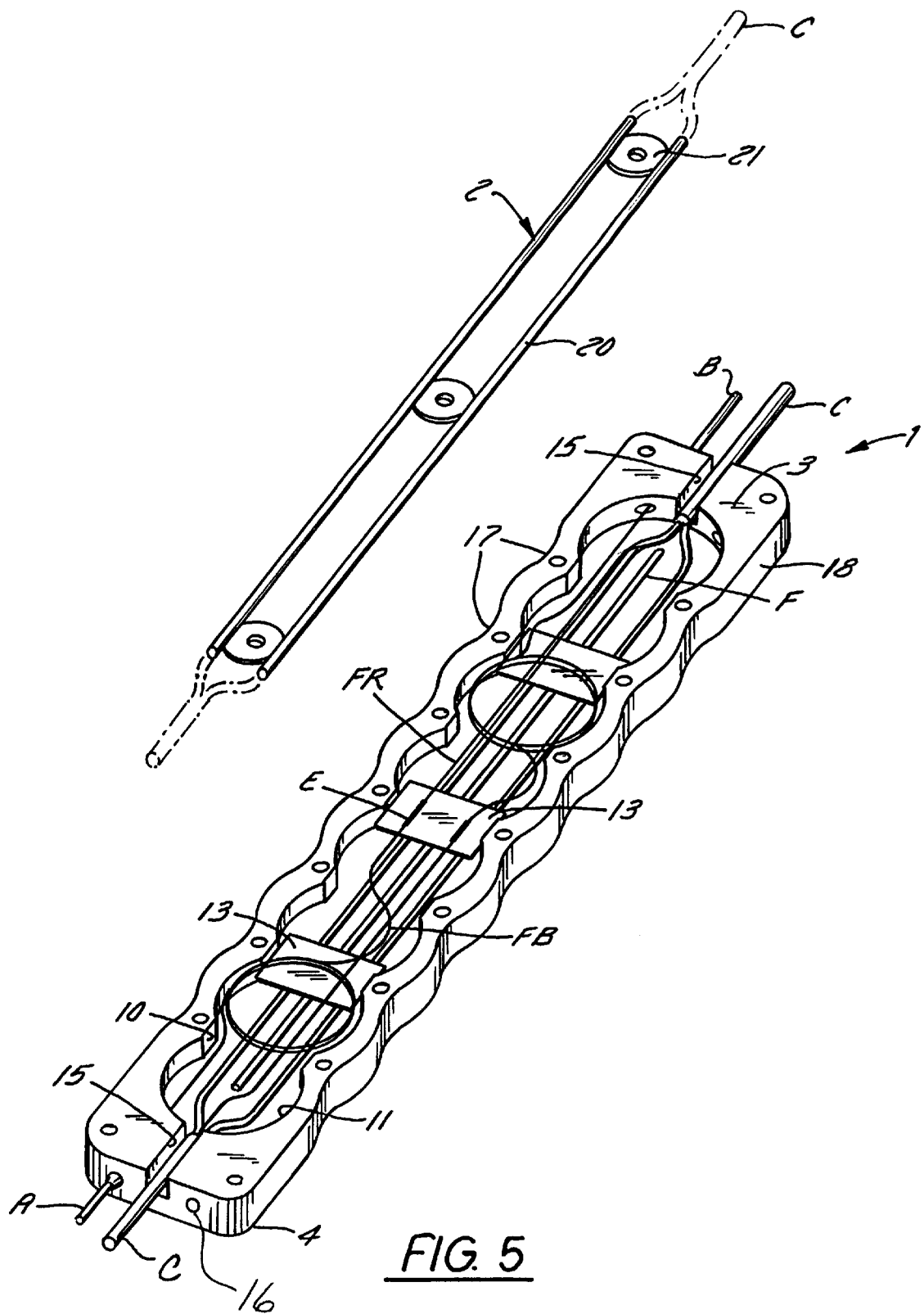

The invention will be better understood after reading the following description which is given as a non-restrictive example with reference to the attached drawings in which:

FIG. 1 shows a diagram of the network illustrating branch connections for client connections, FIGS. 2, 2A and 2B show various prior cable structures, FIGS. 2E and 2F show cable structures with single-tube optical fibers with optical fiber modules shown in FIGS. 2C and 2D, FIG. 3 illustrates the entire box, FIGS. 4A and 4B diagrammatically illustrate a cross-section through the box, for micro-duct and for strip or ribbon type optical modules respectively, FIG. 5 illustrates the base of the box according to the invention and its spacer.

The box according to the invention is identified as mark 1 in FIGS. 3 and 5 in which it is shown. This box has an elongated shape, and is provided with a base 3 (FIG. 3 or 5) and a cover 40 (FIG. 3).

The base 3 comprises a series of rounded compartments 11 with identical dimensions. The diameter of these compartments corresponds to the allowable curvature on a fiber or mini-cable.

A longitudinal channel 10 passes diametrically through all compartments 11 along the longitudinal axis of the box. This channel 10 terminates at each end by a notch 15 through which the connected cable passes, sealed by a sealing mastic 12.

This notch-shaped crossing 15 is rectangular, and its cross-section is greater than the cross-section of the 288-fiber cable (for example 15 mm×box depth) Therefore, it can hold any cable with a smaller diameter, for example 144-fiber cables with diameters of 10 to 15 mm.

Threaded holes 16 on each side of this crossing are provided to contain crossings for connecting and connected cables A and B, manufactured industrially, and cable glands or mini-tube connectors.

These threaded holes 16 have a standard diameter. The cable is inserted into these crossings through one of its ends, unlike the connected cable that is inserted radially in its notch.

A cold polymerizable polyurethane mastic product of the type frequently used for automobiles is used for sealing.

After preparation by stripping, cable 1 is opened into two parts without destroying the carriers, which avoids the need for any anchorage structure.

The spacer 2, shown in more detail in FIG. 5, is composed of two tubes (or rods) 20 welded onto washers 21 themselves perforated with a hole. This keeps the two cable half-ducts separated, which facilitates access to fiber modules, and the branch connection operation thus enabling risk-free manipulation.

Screws 22 are inserted through the hole in washers 21 for attachment to the bottom of the box.

Therefore, the cable is encased in the box. Platelets 13 hold the cable and the optical module in position. They also perform the function of containing splices after welding or a mechanical connection. A mastic is used to hold these splices in place, together with an assembly that may be derived from the patent description submitted by the applicant as No. FR 96 02410 published under No. 2 745 393 on Aug. 29, 1997.

The half-ducts G are preferably assembled to the spacer 2 with links 14 in order to prevent any accidental damage to the optical modules.

A minimum but essential over-length of the connecting cables is left free in the compartments.

In order to save material, the outside of the box is approximately the same shape as the inside, resulting in a corrugated shape in which recesses 17 can be seen along the edges 18 of the box. This special shape contributes to stiffening the box due to the axial and longitudinal moment of inertia.

The box is closed by assembling a cover 40 and a gasket 41 of the same shape. This cover 40 compresses the flat gasket 41 by means of a series of clips 30 that are located in the recesses. These clips facilitate fast closing without any over-thickness.

However, screws 41 placed in the thickness of the recess enable assembly by conventional means.

It would be quite possible to use the principle of oblong buttonhole-shaped cavities 43, in order to avoid the need to unscrew all screws. In this case, the screws are loosened slightly, the cover is placed under the screw heads after sliding longitudinally, and the screws can be tightened quickly to assemble and seal the box.

Advantageously, the box may be made using a plastic injection technique. It is about 30 to 40 mm thick (the cover thickness is about 5 mm) and it is about 800 mm long.

What is claimed is:

1. A junction box for connecting a first cable to a second cable, the first cable having a plurality of fiber modules and a casing that is separable along a portion of its length to form two portions, the junction box comprising:

a longitudinally elongated, hollow support base having a first end and a second end, and suitable for a tensioned crossing of the first cable from the first end to the second end, and a spacer formed of two parallel rods for holding apart the two portions of the first cable casing inside the support base in order to free at least one of the plurality of fiber modules that is cut and spliced to the second cable.

2. The junction box according to claim 1, wherein the two parallel rods are fixed to a plurality of box attachment washers.

3. The junction box of claim 1, wherein the second cable includes a fiber module and the support base comprises several successive rounded compartments to contain an over-length of the fiber module of the second cable.

4. The junction box according to claim 1, wherein the first end and the second end each include a respective notch for receiving the first cable, and wherein the first end also includes a hole for receiving the second cable.

5. The junction box according to claim 2, wherein the box attachment washers each include a hole and wherein a plurality of screws are each inserted through a respective hole to attach the spacer to the support base.

6. The junction box according to claim 3, wherein the support base is generally parallelepiped-shaped and includes a channel extending along a longitudinal axis of the support base and passing through all of the several compartments.

7. The junction box according to claim 6, further comprising at least one splice support plate placed along the channel.

8. The junction box according to claim 7, wherein the splice between the second cable and the plurality of fiber modules of the first cable occurs at a splice support plate.

9. The junction box according to claim 6, wherein the junction box further includes a cover and a gasket placed between the cover and the support base, wherein the longitudinal edges of the support base have a corrugated shape corresponding to the shape of the several successive rounded compartments, and the cover is attached to the support base by a plurality of clips so that the cover exerts pressure on the gasket.

\* \* \* \* \*